Sept. 9, 1958

W. C. CHAFFEE 2,851,295

SOCKET ADAPTOR

Filed Dec. 20, 1954

Inventor
Walter C. Chaffee
By Carlson, Pitzner, Hubbard & Wolfe
Attorneys

United States Patent Office 2,851,295
Patented Sept. 9, 1958

2,851,295

SOCKET ADAPTOR

Walter C. Chaffee, Spring Lake, Mich., assignor, by mesne assignments, to Gardner-Denver Company, a corporation of Delaware Application December 20, 1954, Serial No. 476,332

4 Claims. (Cl. 287—119)

The present invention relates generally to separable connections between driving and driven rotatable elements such, for example, as the familiar socket connections between two components of a rotary tool. More particularly, the invention relates to socket adaptors for retaining separable parts in telescoped driving relation.

It is a general object of the invention to provide a socket adaptor for maintaining engagement of driving and driven elements of a rotary tool embodying an improved and simplified construction and arrangement for retaining the parts in engagement under the most severe conditions, such for example, as are encountered in the use of impact wrenches, and which adaptor embodies retaining means especially formed to permit of economical manufacture.

Another object of the invention lies in the provision of an improved adaptor in which the retaining means embodies elements which are substantially immune to fatigue and failure due to repeated shock from impact and which do not impair the strength of the tool elements maintained in engagement thereby.

The objects of the invention thus generally set forth together with other objects and ancillary advantages will become apparent from the ensuing description taken in conjunction with the accompanying drawings in which.

Although the invention has been shown and described in detail with reference to a particular embodiment thereof, there is no intention that it thus be limited to such detail. On the contrary it is intended to cover all modifications, alternative constructions, and equivalents falling within the spirit and scope of the invention as expressed in the appended claims.

In many rotary tools, such as wrenches, screw drivers, drills and the like, a common power source and spindle are employed with a plurality of different tool elements which may be alternatively applied so as to be driven by the spindle. Commonly the tool elements are especially formed and sized to accommodate particular shapes and sizes of workpieces. Tool elements which are utilized in effecting mass production require replacement after having sustained a certain amount of wear. Conventionally, therefore, the driving element or spindle of a rotary tool is formed with a socket adaptor for successively receiving various tool elements. Such socket adaptors commonly comprise the forming of the outer end portion or shank of the spindle of polygonal, usually square, cross section which are adapted for telescopic reception in complementally formed openings or recesses in tool elements which are to be driven thereby. It is necessary in such an arrangement to accommodate various tool elements in which the sockets or recesses are of slightly different sizes due to different manufacturing tolerances and wear resulting from use. As a result the shank adaptors are commonly provided with means for retaining the various socketed tool elements against accidental axial movement thereof. The spindle and tool element may be separated when the two parts are affirmatively pushed together or are pulled apart.

Figure 1:
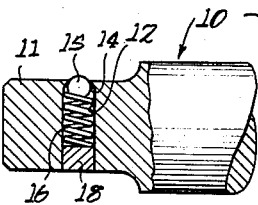
Figure 1 is a fragmentary transverse section of a prior art socket adaptor.

Referring to the drawing, Fig. 1 illustrates one prior art form of socket adaptor wherein a shaft 10 has its squared outer end shank portion 11 adapted to be telescoped within a complementally squared socket of a tool element (not shown). For retaining the tool element in place on the shank 11, except when the two are affirmatively pulled apart, the shank is formed with a transverse hole 12 for the reception of a ball detent 15. The hole 12 is necked down, as at 14, adjacent one end thereof to retain the ball detent in position to normally project partially beyond the contiguous surface of the shank 11 under the influence of a helical biasing spring 16. The spring 16 is placed in compression within the hole 12 between the ball and a plug 18, the latter being peened in place in the other end of the hole 12. In use, as the shank 11 is inserted into a complementally formed socket the ball 15 retreats against the biasing force of the spring 16 yet bears against the opposed wall portion of the socket or seats in an internal groove formed in the socket wall, to prevent the latter from accidentally slipping free of the shank 11.

While this prior arrangement is satisfactory for some purposes it has been found that in certain applications the spring 16 is subject to peculiar fatiguing forces and is broken easily. Experience has shown that a critical problem exists in impact wrenches employing this type of retaining means. Such an impact wrench is illustrated and described in E. H. Shaff Patent No. 2,439,756, and in the improved and substantially more powerful impact wrench which is disclosed and claimed in E. H. Shaff copending application Serial No. 411,941, filed February 23, 1954. In these wrenches the intermittent, pounding drive has been found to cause breakage of ball detent biasing springs after operation even of short duration. Moreover, this construction is a relatively expensive one because of the number and the nature of the elements and fabricating operations entailed.

Figure 2:
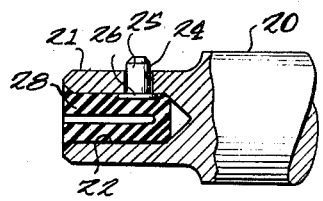
Fig. 2 is similar to Fig. 1, but is illustrative of his second form of prior art adaptor.

In Fig. 2 of the drawing there is shown, by way of further example, a second form of prior art adaptor. There the forward end of a drive spindle 20 is formed with a squared shank 21 for the reception of a complementally formed tool element (not shown). The shank 21 is formed with an axial recess 22 and with a transverse hole 24, communicating with the recess from one external surface of the squared shank 21. The socket retaining elements in this device include a pin 25 which is inserted through the hole 24 and which has an enlarged head 26 normally in engagement with the inner surface of the recess 22. The pin is biased outwardly into a radially projecting position by means of a plug 28 of resilient material, such as rubber. The plug 28 is forced axially into the recess 22 so that it is circumferentially compressed.

In use, as the shank 21 is inserted into the socket or recess of a cooperating tool element the detent pin 25 is pressed inwardly against the plug 28 thereby deforming the latter. With the tool element in place the pin 25 frictionally engages the inner surface of the socket or recess of the tool element and prevents the tool element from inadvertently slipping from the spindle shank of the tool with which it is used. This construction and arrangement, however, has not proved completely satisfactory, since the shank 21 of the drive spindle is considerably weakened by the relatively large axial recess which is necessary to accommodate the resilient plug 28 and to permit assembly of the detent pin 25 in the hole 24. Further, the presence of the hole 24 tends to cause a force concentration there. Under the heavy pounding drive as is encountered in impact wrenches, for example, failure of spindle shanks so formed has been experienced.

In accordance with the present invention the aforementioned disadvantages of these prior art arrangements are effectively obviated through the provision of an improved socket adaptor construction for retaining a tool's spindle shank and a driven tool element in engaged relation. More particularly, in carrying out the invention the polygonal shank portion of the tool spindle is formed with a transverse, stepped passage which receives a flanged detent or pin and an elongated, resilient plug. The pin projects through the cross-sectionally smaller portion of the passage under the action of the resilient plug which is held in lengthwise compression within the passage solely by radial compression of an enlarged head formed integrally with the plug and inserted in the cross-sectionally larger portion of the passage. The plug being formed of a resilient material is substantially immune to fatigue and failure due to shock even though the shock be frequently repeated. The arrangement is further advantageous in that it requires only two components for the retaining means, namely, the pin and the plug.

Figure 3:
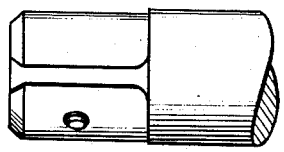
Fig. 3 is a side elevational view of an exemplary socket adaptor constructed and arranged with frictional retaining means embodying the features of the present invention.
Figure 4:
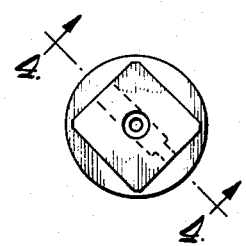
Fig. 4 is an end view of the adaptor of Fig. 3.
Figure 5:
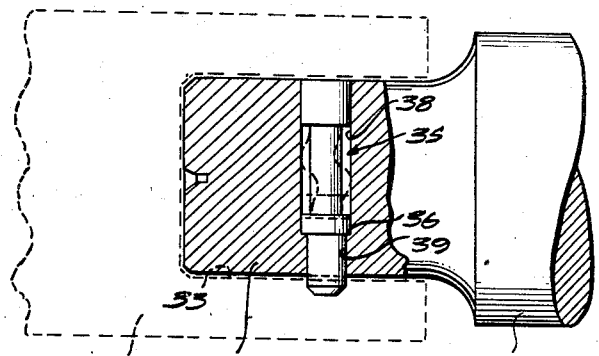
Fig. 5 is a side elevation, partly in section, of the improved socket adaptor taken substantially in the plane of line 4—4 in Fig. 3 and showing, in broken lines, a cooperating tool element.
Figure 6:
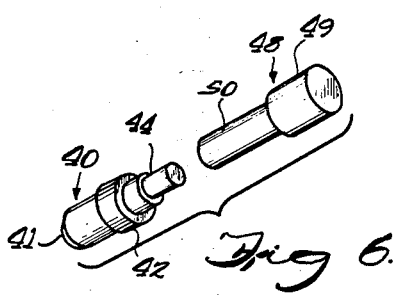
Fig. 6 is an exploded perspective view illustrating the components employed in the adaptor shown in Figs. 3, 4 and 5.

Referring more particularly to the exemplary embodiment of the invention as shown in Figs. 3 through 5 of the drawing, the socket adaptor comprising the illustrative embodiment of the invention includes the spindle 30 which is formed with a polygonal, in this case square, shank 32. The shank 32 is adapted to be telescopingly received for driving connection within a complementally formed recess 33 in a tool element such as a socket 34, the latter being indicated in broken lines in Fig. 5. Preferably the shank 32 is beveled at its corners and along its end edges in order to facilitate such insertion within the socket recess 33.

The shank 32 is formed with a stepped, transverse passage 35 having an internal annular shoulder 36 intermediate its ends separating relatively larger and smaller diameter portions 38 and 39 respectively, which open on opposite sides of the shank. A pin 40 is disposed within the passage 35 and has its outer end formed with a beveled tip 41. The pin extends through the smaller diameter passage 39 so that the tip 41 normally projects slightly beyond the contiguous shank surface. For limiting outward movement of the pin 40 in the passage 35, it is provided with a peripheral flange 42 intermediate its ends for engagement with the passage shoulder 36. At its inner end the pin is of reduced diameter so as to define a finger 44.

For biasing the pin 40 outwardly into the position shown in full lines in Fig. 5 an elongated plug 48 is provided which is formed of a suitable resilient material such as natural or synthetic rubber. The plug 48 is disposed within the larger diameter portion 38 of the passage 35. The plug 48 is formed at its outer end with an enlarged head 49. The head 49 is preferably of cylindrical form and is so fashioned that its unrestricted diameter is considerably larger than the diameter of the passage portion 38. When the plug 48 is inserted in place in the passage its head 49 is radially compressed. Thus, the plug is maintained in place by frictional engagement with the wall of the passage 35 due to the normal resilience thereof.

Figure 7:
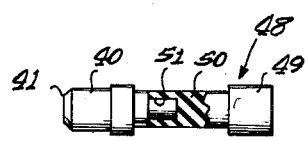
Fig. 7 is a detail side elevation, partly in section, of the retaining elements as shown in Fig. 6, but here in assembled relation.

The opposite end of the plug 48 is fashioned to provide a body portion 50 which is of a smaller diameter than that of the larger passage portion 38. At its inner end the plug body 50 bears against the inner end of the pin 40 so as to yieldably urge the latter into the projecting position illustrated in full lines in Fig. 5. In this condition the body 50 is substantially straight and is coaxially disposed within the enlarged passage portion 38. Preferably, as shown in Fig. 7, the body 50 of the plug 48 is axially recessed at 51 to receive the reduced diameter finger 44 of the pin 40 and it is thus maintained in proper alined engagement therewith.

In use, as a tool element, such as the socket member 34, is telescoped over the shank 32 the inner surface of the socket recess 33 engages the beveled tip portion 41 of the pin 40 and moves the pin 40 inwardly within the passage 35 against the biasing action of the resilient plug 48. This inward movement of the pin 40 therefore applies an axial compressive force to the plug 48, which results in deformation thereof. Such deformation may cause the body portion 50 of the plug 48 to assume a configuration such as that illustrated in dotted lines in Fig. 5, due to the difference in diameter of the plug body and the enlarged passage portion 38. Even under severe axial compression the plug 48 cannot slip from the passage 35 because with the insertion of the shank 32 within the socket recess 33 the outer surface of the plug head 49 is disposed in juxtaposed relation with the opposite surface of the socket recess 33. With the resilient plug 48 thus compressed the pin 40 is urged with considerable force against the oppositely disposed portion of the inner surface of the socket 33 and, thus, by the frictional engagement between it and the socket, the latter is restrained against accidental separation from the shank 32, to the end that affirmative action on the part of a user of a tool so equipped is required to remove the tool element such as the socket 34 from the shank 32.

It has been found that a socket adaptor constructed and arranged in accordance with the teachings of the present invention is immune to fatigue and failure even under the most severe operating conditions such as those encountered in the use of impact wrenches. The resilient material employed for the biasing plug 48 has apparently obviated the inherent disadvantages of spring biased ball detent types of retaining means such as that illustrated in Fig. 1 of the drawing. Moreover, the present construction and arrangement requires a substantially smaller transverse passage through the spindle shank portion of the tool than that heretofore required for detent means, so that the shank is not materially weakened, as was the case with detent means such as that embodied in the spindle shank construction illustrated in Fig. 2. While the improved socket adaptor construction has proved highly effective and reliable in continuous operation such as that encountered in production and assembly line operation, the instant construction requires but the simplest and least expensive components and fabricating steps. It will be apparent, therefore, that the advantages of simple and economical manufacture are thus achieved in addition to effectiveness and reliability in operation.

I claim as my invention:

1. In a device for separably and drivingly connecting two rotatable elements of which one has a recess of polygonal cross section, an adaptor comprising, in combination, a polygonal shank on the other of the elements complementally shaped for telescoping into the recess, said shank having a transverse passage therethrough with cross-sectionally larger and smaller portions defining an annular shoulder, a flanged pin slidably disposed in said passage and having one end projecting through said smaller passage portion and having its flange disposed for engagement with said shoulder, and an elongated plug disposed in said passage, said plug having an enlarged head portion compressed within the outer end of said larger passage portion to be frictionally held in the passage and having a resilient body portion interposed between said head and said pin in lengthwise compression for yieldably urging said pin outwardly of said passage whereby said flange normally engages said shoulder and the outer end of said pin projects beyond the contiguous surface of said shank for engagement with the inner surface of the one element.

2. In a device for separably and drivingly connecting two rotatable elements, one of which has a recess of polygonal cross section, and an adaptor comprising, in combination, a shank on the other of the elements complementally shaped for telescopic reception within the recess of the one element, said shank having a transverse passage therethrough with portions having larger and smaller diameters defining intermediate the ends of said passage an internal annular shoulder, a pin slidably disposed in said passage with its outer end projecting through said smaller passage portion, said pin having a peripheral flange disposed inwardly from the outer end thereof for engagement with said shoulder and a resilient plug having a head portion frictionally held in the outer end of said larger passage portion and having a body portion of reduced diameter within said larger passage portion and in engagement with the inner end of said pin, said plug being longitudinally compressed to yieldably urge said pin to project from said passage.

3. In a rotary tool including a spindle terminating at its outer end in a shank of polygonal cross section adapted for telescoping engagement with a complementally formed tool element, an adaptor for retaining the shank and tool element in engagement against accidental separation, said adaptor comprising, in combination, a pin having limited axial movement in one end of a transverse passage in the shank, and a resilient plug confined within the shank passage, said plug including a body portion of reduced diameter in engagement with the inner end of said pin for urging said pin outwardly with respect to the passage so that its outer end normally projects beyond the contiguous shank surface, the outer end of said pin being adapted for engagement with the juxtaposed surface of the tool element upon engagement between the element and the shank, and a head portion of enlarged diameter frictionally held in the passage, the body portion of said plug being deformable upon inward movement of said pin upon the application of force thereon by said tool element upon telescoping engagement of the shank and the tool element.

4. In a rotary tool including a spindle terminating at its outer end in a squared shank adapted for telescoping engagement within a complementally recessed tool element, said spindle having retaining means for preventing accidental separation of said shank and tool element, said retaining means comprising a pin axially movable in one end of a stepped transverse passage extending through the shank, said pin having a peripheral shoulder intermediate its ends engageable with the passage step to limit outward axial movement thereof in said passage, said pin terminating at its inner end in a finger, and a resilient plug including a body portion having a recess in the forward end thereof for the reception of said pin finger, said plug being confined within the shank passage and urging said pin outwardly so that its outer end normally projects beyond the contiguous shank surface, the outer end of said pin being adapted for engagement with the wall of the tool element recess, and the body portion of said plug being deformable to permit inward movement of said pin upon application of force thereon by said tool element upon insertion of the shank within the tool element recess.

References Cited in the file of this patent

UNITED STATES PATENTS

| | | |
|---|---|---|
| 2,099,246 | Raffles | Nov. 16, 1937 |
| 2,429,494 | Stephens | Oct. 21, 1947 |
| 2,538,919 | Shaff | Jan. 23, 1951 |
| 2,588,901 | Weikert | Mar. 11, 1952 |